BELL & ISETT.
Making Iron Direct from Ore.
No. 11,927.
Patented Nov. 14, 1854.
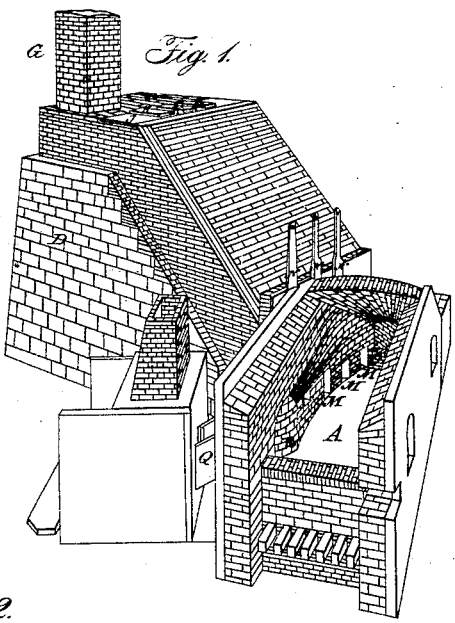
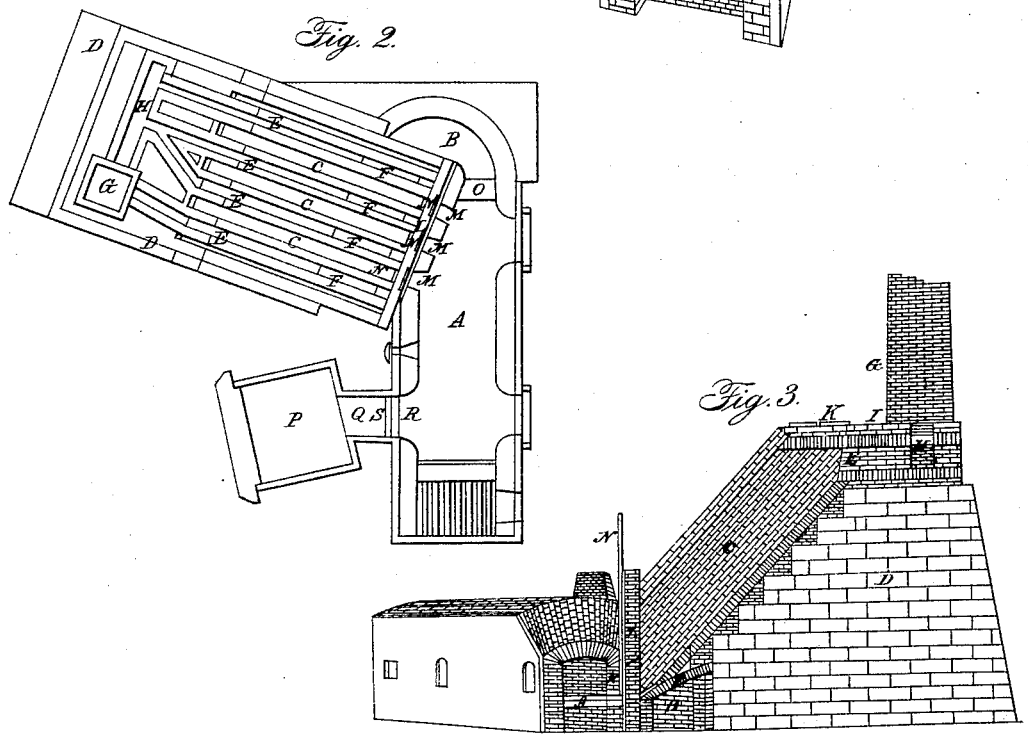
Witnesses:
Inventor:

UNITED STATES PATENT OFFICE.

MARTIN BELL, OF SABBATH REST, AND E. B. ISETT, OF TYRONE, PA.

IMPROVEMENT IN FURNACES FOR MAKING IRON DIRECT FROM THE ORE.

Specification forming part of Letters Patent No. 11,927, dated November 14, 1854.

*To all whom it may concern:*

Be it known that we, MARTIN BELL, of Sabbath Rest, and EDWARD B. ISETT, of Cold Spring Forge, Tyrone city, both in the county of Blair and State of Pennsylvania, have invented certain new and useful Improvements in Apparatus for Making Iron, whereby puddled or fibrous and laminated charcoal malleable iron can be made direct from the ore; and we do hereby declare that the following is a full, clear, and exact description of the construction and operation of the same, reference being had to the accompanying drawings, making a part of this specification, in which—

Figure 1 is a perspective view of the apparatus, (from an elevated position,) showing the interior of the reverberatory furnace, having the front and top covering removed; Fig. 2, an orthographic view of the deoxidizing chamber and stack, (having the covering of the flues and ore-tubes removed,) in connection with a like view of a horizontal section of the reverberatory furnace and the forge-fire chamber; and Fig. 3, a sectional elevation showing the reverberatory furnace, flues, an ore-tube, chimney, and general foundation in combination.

Our invention is, first, of improvements on the apparatus heretofore invented for making puddled or fibrous wrought-iron direct from the ore, in which the ore, mixed with carbon and contained in crucibles, closed tubes, or chambers, is subjected to the qualified heat of a furnace for the purpose of deoxidizing the same previous to its being subjected to the usual purifying and welding process in a puddling-furnace, resulting in the production of the "loops" or "balls" of puddled or fibrous iron; and, second, of improvements in the combination and arrangement of devices whereby this fibrous or puddled iron is converted into laminated charcoal malleable iron direct from the hot spongy loops or balls without a material loss of heat in the said loops or balls, the process being a continuous one, producing the laminated charcoal malleable iron direct from the ore in a more economical and expeditious manner, the formation of the loops or balls in this case being only intermediate.

In the year 1836 Mr. Hawkins, of England, obtained a patent for, and appears to have been the first to manufacture, puddled or fibrous wrought-iron direct from the ore by first deoxidizing the ore, previously mixed with carbon, in "close vessels or a chamber" heated by a furnace, though chemical experiments illustrative of the same principles in the deoxidation of ore had previously been made by others. In the next year Mr. Clay (of England) obtained a patent for the application of the "waste heat" of a puddling or other furnace for the purpose of deoxidizing the ore in "close vessels," the ore, after being deoxidized, "to be immediately conveyed into a balling or puddling furnace." In the year 1839 Mr. Sanderson (also of England) obtained a patent in part for an arrangement whereby the hot deoxidized ore could be conveyed in a box having wheels and adapted for rolling freely upon a track fixed upon the top of a puddling-furnace, so that the hot ore could be easily dropped through a suitable opening directly on the required place in the furnace. Subsequently several apparatuses or devices have been made in this country for making wrought or malleable iron direct from the ore. In 1841 Mr. Quilliard obtained a patent for a process and apparatus very similar, if not identical, with Clay's; and in 1850 Mr. Dickerson obtained a patent for a furnace combined with a deoxidizing-crucible or annular chamber so placed that the deoxidized ore may be deposited on the puddling-floor "without being exposed to the atmosphere at any period of its reduction into balls." This device appears to have been impracticable for manufacturing iron profitably, mainly from the great liability of the lower part of the annular chamber to rapid destruction from the extreme heat to which it was necessarily exposed, and this principal defect, with some others, is clearly pointed out in the specification of James Renton, who obtained a patent in 1851 for a combination of devices designed, mainly, for the purpose of remedying the defective construction and arrangements of Dickerson's improvements.

The chief improvement of Mr. Renton appears to be in the interposition of a "receiving ore-box" of a peculiar construction between the lower ends of certain vertical tubes or ore-vessels and the products of combustion or heat of the furnace, whereby the rapid destruction of the bottoms or lower ends of the ore tubes or chamber is prevented. In so far as this destructive effect of the extreme heat of the furnace is prevented, it is an important improvement; but there are some very objectionable practical defects connected with and arising from this and other combinations in Mr. Renton's furnace, and chief among them may be instanced the greater complication and consequently increased expense in the construction of the apparatus, the great difficulty, perhaps impossibility, of constructing his peculiar deoxidizing-chamber so as to be durable and not liable to frequent derangements, and the too compact state of the ore while being deoxidized in the tubes, arising from their vertical position, and also from the same cause, the too sudden and violent descent of the deoxidized ore into the receiving-box or into the furnace, unless impeded or checked by a complication of inclined planes and valves attached to the lower ends of the vertical ore-tubes, and which are not generally effective of the purposes designed.

Since the application by Mr. Clay, in 1837, of the "waste heat" of a furnace for the purpose of previously deoxidizing the ore in close vessels, "to be immediately conveyed into a furnace," purified and welded into a loop of malleable iron, there does not appear to have been any advance or improvements in this mode of manufacturing iron, except in the devices and their arrangements or combinations for the more perfect deoxidation and speedy and convenient transfer of the deoxidized ore to the puddling-floor of the furnace, and chief among these may be again noted the railroad-box of Sanderson, the stationary annular ore-vessel of Dickerson opening into the furnace, and the intermediate ore-receiving box or chamber of Renton opening on the preparatory floor of the furnace.

The nature of our invention of improvements for making puddled or fibrous and laminated charcoal malleable iron directly from the ore consists in remedying or obviating the serious practical difficulties, before indicated, attending all the combinations, arrangements, and constructions heretofore invented for deoxidizing the ore and bringing it into the puddling-furnace for welding into the loops or balls by means of a new construction, combination, or arrangment of the deoxidizing tubes and flues in relation to the reverberatory or puddling furnace.

In the accompanying drawings the same letters indicate like parts when on the several figures.

A represents the floor or bottom of a puddling or reverberatory furnace of the usual construction, the flue B of which is made to pass in a downward direction around to and thence horizontally back under the lower ends of a series of ore-tubes, C C C, which rest, at an angle of inclination of about fifty degrees, upon a strong stone or brick foundation, D. On both sides of each of these ore-tubes there is left a sufficient flue-space, E E E E, communicating with the main flue beneath, through the openings F F F F in the supporting arch or roof of the said main flue, and extending upward on the inclined part of the foundation, parallel with the ore-tubes, until they leave them at a bend near the top, and pass in horizontal directions into the chimney G, or into a cross-flue, H, which leads into the chimney. The ore-tubes C are each made about three feet deep, eight inches wide, and ten feet or more long on the inside, and their heating-flues E of the same depth, and about six inches wide. The ore-tubes and their flues are built of fire-brick in a substantial manner, and covered with, say, one course of fire and two courses of red bricks. On the top or filling floor I the flues about the mouths of the ore-tubes are covered by fire-bricks, and on these an iron plate, J, is laid, having an opening eight by eighteen inches through it for each ore-tube, and through these openings the mixed ore and carbon is introduced. These openings are also each fitted with an adjustable cast-iron cover, K, having a hole in the middle about four by four inches for the free escape of the gas. The lower ends of each of the ore-tubes C communicate by a horizontal opening twelve or thirteen inches high and eight inches wide through an adjoining vertical wall, L, and also through the adjoining side of the reverberatory furnace with the interior thereof, as shown at M M M, and at the lower end of each ore-tube there is fitted a sliding gate, N N N, for the purpose of excluding the blast from the tubes, and also for admitting the ore into the furnace, as required; and just beyond the openings M from the tubes there is a flue-bridge, O, to prevent the deoxidized ore passing into the flue.

The reverberatory furnace and the foundation of the ore and flue chamber are placed in a plane at an angle with each other of about one hundred and ten degrees, for the purpose of affording more convenient access of the workman to the ore coming from the openings M, and also because the arrangement admits of a more substantial and durable construction. It will now be perceived that the main flue B, passing in a semicircular direction at the back end of the furnace, returns across under the lower ends of the ore-tubes, and, passing through the openings F, is divided, so as to carry the heated products of combustion along on both sides of each ore-tube the whole length of each, then open into the chimney through the horizontal flues beneath the filling-floor. It will also be perceived that from the peculiar arrangement of the lower ends of the ore-tubes, being outside of the furnace and at a distance from the high heat of the flame in the furnace equal to the length of the horizontal openings M M M, they are perfectly secure against destruction from this cause, which, as before stated, rendered Dickerson's arrangement unprofitable and Renton's intermediate ore-receiving box necessary. It will further be perceived that as our ore-tubes are constructed of fire-brick and placed on a substantial bed at a suitable angle of inclination the contained ore and carbon lie comparatively loosely, or not under the pressure of a superincumbent mass of ore and carborn, impeding the free escape of the gases therefrom, as is the case in all the deoxidizing-tubes or ore-vessels as heretofore constructed and arranged; and also the angle at which the ore-tubes are inclined, being only sufficient to cause the deoxidized ore to descend gradually and directly into the furnace through the horizontal openings M when the sliding gates N are raised; that the complication of "adjustable and stationary valves" and "inclined planes" at the lower ends of the tubes, as required in Mr. Renton's apparatus, are entirely dispensed with, and a more simple, durable, and practicable apparatus produced.

In the matter of secluding the deoxidized ore from a short temporary exposure to the atmosphere while being transferred from the deoxidizing-chamber to the puddling-floor of a furnace, abstractly considered, it is not believed to be of much importance; but whether of importance or not, in view of the suggestions of Mr. Clay in 1837, of the devices of Mr. Sanderson in 1839, and subsequently those of Mr. Dickerson and Mr. Renton, simplification and convenience in the structure and arrangement of devices for conveying the deoxidized ore directly into the furnace is undoubtedly important, and we know these desirable points are more perfectly attained by our construction and arrangement than by any other heretofore invented.

The second part relates to the combination of a charcoal "forge-fire" or "sinking-furnace" with the above-described part of our apparatus.

P is the hearth of the forge-fire chamber or sinking-furnace, which may be constructed of the usual form and materials.

Q is the short connecting-trough or inclined way, combining the forge-fire apparatus immediately with the reverberatory or puddling furnace.

R is the doorway, through which an open communication can be made with the inclined trough Q and forge-furnace.

S is the sliding fire-proof door, arranged so as to be readily opened or closed as occasion may require.

The forge-fire apparatus is placed at an angle with and as near as may be to the reverberatory furnace, having in view the application of the blast and the convenience of the workman.

Laminated charcoal malleable iron, we believe, has never before been made direct from the hot spongy loops or balls of fibrous iron taken from the puddling-furnace, whether the said loops or balls were made from pig-iron or directly from the ore; and it being an important and economical process for producing the laminated iron, we have invented and adopted the combination of apparatuses herein just described for carrying out the said process.

The mode of operation of our invention for manufacturing puddled or fibrous and laminated charcoal malleable iron directly from the ore is as follows: The ore, being previously roasted, broken fine, and mixed with the previously-ascertained proportion of coal, (usually about twenty per cent. of the ore,) is elevated to and deposited on the filling-floor I, and from which the ore-tubes C are filled and the covers replaced. The furnace being in blast, the heated products of combustion passing therefrom through the flues to the stack or chimney bring the tubes containing the ore and carbon to a sufficient heat for deoxidizing or producing a combination of the oxygen of the ore with the carbon with which it was mixed, the resulting carbonic-oxide or carbonic-acid gas escaping through the openings or holes in the lids which cover the mouths of the ore-tubes. After the ore is thus sufficiently deoxidized the sliding gates N are successively raised, and the ore, sliding gently down into the furnace through the horizontal openings M, is moved forward by the workman on the puddling-floor of the furnace to the place where it is, in the usual manner, "brought to nature" and welded into the loops or balls. At this stage of the process the loops or balls have heretofore been, and (if the fibrous iron is desired) they may now be, conveyed out from the furnace to the hammer and converted by shingling into the puddled bloom; but for the purpose of converting the fibrous iron of the loops or balls into laminated charcoal malleable iron we continue the process by rolling or forcing the hot spongy loops or balls through the opening R, and, by means of the plane Q, directly into the forge-fire or sinking-furnace, where the iron of the said loops or balls is refined and converted into laminated charcoal malleable iron by means of charcoal in combustion, urged by a blast in the usual manner. As the deoxidized ore is removed from the tubes the sliding gates N are shut down and the tubes refilled, so that the deoxidizing process continues, and a supply of deoxidized ore may be ready for the puddling-floor, as the workman may require.

Having thus given a full, clear, and exact description of the construction and operation of our improved apparatus for making puddled or fibrous and laminated charcoal malleable iron direct from the ore, we proceed to state that we do not claim as our invention the principle involved in the use of close deoxidizing vessels or tubes, combined with a furnace for deoxidizing iron ore mixed with carbon; nor the application of the waste heat of a reverberatory or other furnace for giving the necessary heat to the ore vessels or tubes for the same purpose; nor do we claim the principle involved in the conveyance of the deoxidized ore immediately from the ore vessels or tubes into the furnace, as these discoveries have all been made and applied, as before shown, some years ago; nor do we claim making deoxidizing ore-tubes simply with inclined bottoms, as these have been used before by Dickerson, and also by Renton, as before stated; nor do we claim the use of an inclined flue-bottom or other open chamber or chambers for deoxidizing the ore, as these have also been used before; nor do we claim combining the forge-fire with a reverberatory furnace, as we find this combination also has been used before; but

What we claim as our invention, and desire to secure by Letters Patent, is—

The series of inclined close deoxidizing tubes or vessels C, built of common fire-bricks, and arranged so as to be parallel, or nearly so, with each other, and inclined at an angle of about fifty degrees from the horizon, so as to lie or rest their whole length securely upon a substantial inclined base, as described and illustrated, and also so as to be exposed only on the two opposite outer sides of each tube to the action of the escaping heat from the furnace as it passes along through the intermediating flues, E, the same being combined with the main flue B through the openings F, and with the interior of the furnace, in the manner described and illustrated, each ore-tube having an adjustable cut-off or sliding gate, N, at its lower end, as described, and also combined with a separate horizontal way, M, as described, leading directly into and connecting the said tubes with the bottom of the reverberatory furnace, as described, the whole being constructed, arranged, combined, and operating substantially as and for the purposes as described.

MARTIN BELL.
EDWARD B. ISETT.

Witnesses:
J. M. BELL,
JOHN COX.